(12) United States Patent
Gabrielson

(10) Patent No.: US 8,543,821 B1
(45) Date of Patent: Sep. 24, 2013

(54) SCALABLY DISPLAYING SENSITIVE DATA TO USERS WITH VARYING AUTHORIZATION LEVELS

(75) Inventor: Jacob Gabrielson, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/284,198

(22) Filed: Oct. 28, 2011

(51) Int. Cl.
*H04L 9/32* (2006.01)

(52) U.S. Cl.
USPC .......................................................... 713/171

(58) Field of Classification Search
USPC .......................................................... 713/171
See application file for complete search history.

(56) References Cited

U.S. PATENT DOCUMENTS

| | | | |
|---|---|---|---|
| 2006/0200392 A1* | 9/2006 | Shear et al. | 705/28 |
| 2009/0067622 A1* | 3/2009 | Yao et al. | 380/44 |
| 2009/0136028 A1* | 5/2009 | Card, II | 380/200 |

* cited by examiner

*Primary Examiner* — Kambiz Zand
*Assistant Examiner* — Stephen Sanders
(74) *Attorney, Agent, or Firm* — Hope Baldauff, LLC

(57) ABSTRACT

Common content is generated and provided to client computer systems. The common content includes encrypted portions, corresponding unencrypted portions, and decryption key identifiers that identify decryption keys for decrypting the encrypted portions. Decryption keys are provided to the client computer systems separately from the common content for decrypting portions of the common content that an associated user is authorized to view or otherwise utilize. In order to use or display the common content, the client computer systems determine for each encrypted portion in the common content whether an associated decryption key has been received. Each encrypted portion for which a decryption key is available is decrypted and displayed or otherwise utilized. For each encrypted portion for which a decryption key is not available, the unencrypted portion corresponding to the encrypted portion may be displayed or otherwise utilized.

21 Claims, 6 Drawing Sheets

US 8,543,821 B1

SCALABLY DISPLAYING SENSITIVE DATA TO USERS WITH VARYING AUTHORIZATION LEVELS

BACKGROUND

It is commonly desirable on the World Wide Web ("Web") and in other computing scenarios to display sensitive data to users having varying authorization levels. For example, Web sites, games, and mobile applications frequently present a "leaderboard" of top users. Some leaderboards are configured to display potentially sensitive information about the top users to other users having an appropriate authorization level and to obfuscate the sensitive information for users without appropriate authorization. For example, a leaderboard might be configured to show the name, e-mail address, and/or other personally identifying information of top users to other users that have the authorization to view the information.

Leaderboards such as those described above are typically generated by a server computer in direct response to requests made by client applications for the leaderboard. In order to generate such a leaderboard, the server will determine the appropriate authorization level of the current user and then construct the leaderboard based upon the authorization level of the current user. The leaderboard is then returned to the client application for display to the user. In this way, the user can be presented with only the sensitive information that they are authorized to view.

Separately generating content containing sensitive data, such as a leaderboard, each time a user requests the data works well on a small scale. Generating this type of data for each request on a very large scale, such as 100 million times per hour for instance, can be extremely taxing on the server computers responsible for generating the content.

It is with respect to these and other considerations that the disclosure made herein is presented.

DETAILED DESCRIPTION

Figure 1:
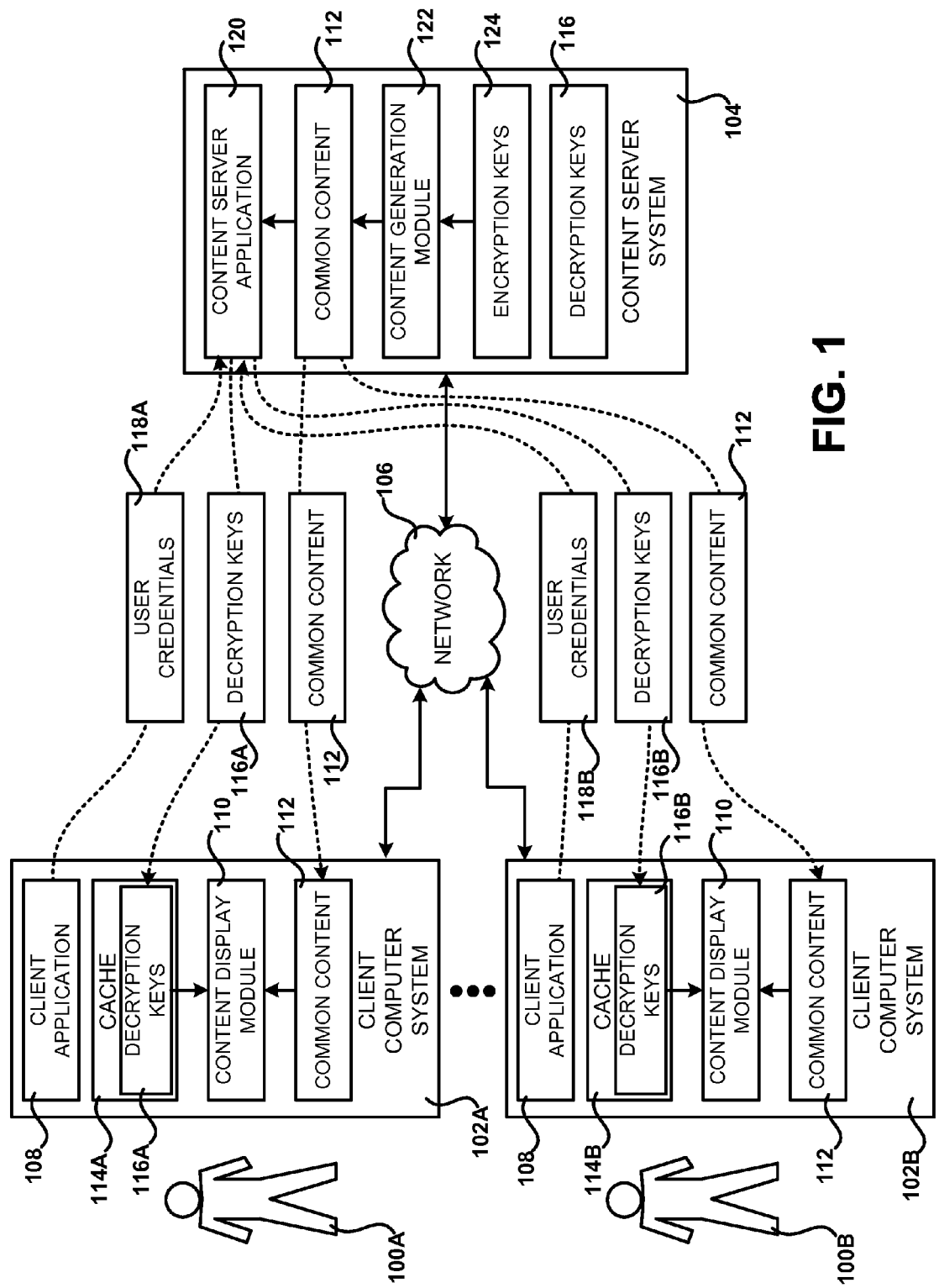
FIG. 1 is a system and network diagram showing aspects of one illustrative operating environment for the embodiments disclosed herein and several software components for scalably displaying sensitive information to users with varying authorization levels.

The following detailed description is directed to technologies for scalably displaying sensitive data to users with varying authorization levels. Utilizing the technologies described herein, content containing sensitive information can be generated and provided to users in a manner that permits the users to view or otherwise utilize only the sensitive information that they are authorized to view, but that also does not require that the content be generated separately for each user. Rather, common content containing the sensitive information can be generated and provided to a large number of users, thereby greatly reducing the burden on the server computers that provide such information.

According to one aspect disclosed herein, a content server system is provided that is configured to generate common content for distribution to multiple client computer systems. In order to generate the common content, the content server system assigns encryption keys to portions of content that include sensitive data, such as personally identifying information and other types of sensitive viewable and non-viewable data. For instance, in the case of a leaderboard such as those described above, encryption keys might be assigned to the names or e-mail addresses of the users identified in the leaderboard. The content server system then utilizes the assigned encryption keys to encrypt the sensitive content.

Once the sensitive portions of the content have been encrypted, the content server system generates the common content for distribution to the client computer systems. The common content includes the encrypted portions and a decryption key identifier for each encrypted portion that identifies a decryption key for decrypting each corresponding encrypted portion.

The common content might also include unencrypted content corresponding to each encrypted portion. The unencrypted portion might be utilized, for instance, to specify an alternate version of the sensitive data contained in the corresponding encrypted portion. For example, if the encrypted portion contains an e-mail address, the corresponding unencrypted portion may store an obfuscated version of the e-mail address, such as "\*\*\*@\*\*\*.com." As will be described in greater detail below, the data contained in the unencrypted portions may be presented to users that do not have authorization to view or utilize the data contained in the corresponding encrypted portions.

Once the content server system has created the common content, the common content may be cached and provided to one or more client computer systems. The common content may be provided in response to requests from the client computer systems, may be "pushed" to the client computer systems, or may be made generally available to the client computer systems such as by way of a content distribution network. Because the sensitive information contained in the common content has been encrypted, there is no need to restrict access to the common content to particular client computing systems.

The content server system is also configured to receive credentials from the client computer systems that can be utilized to determine an authorization level of an associated user. Based upon the determined authorization level, the content server system can determine the portions of the common content that the user is authorized to view or otherwise utilize. The content server system can then provide decryption keys to each client computer system for decrypting the portions of the common content that an associated user is authorized to view and/or otherwise utilize. The number of decryption keys provided to each client computer system may be equivalent to the number of encrypted portions of the common content that the associated user is authorized to utilize. The decryption keys can be provided to the client computer systems prior to providing the common content to the client systems, in conjunction therewith, or after the provision of the common content.

A client computer system is also provided in the various embodiments disclosed herein that is configured to receive and display the common content. In particular, the client computer system is configured to execute a client application that receives the decryption keys from the content server system prior to in conjunction with, or after receiving the common content. The client application may store the decryption keys in a cache for future use. For instance, in one embodiment the client application is a Web browser application that is configured to receive the decryption keys and to store the keys in a Web browser cache. As mentioned above, each of the decryption keys may be utilized to decrypt an associated encrypted portion of the common content.

When the client computer system receives the common content, a content display module executing in conjunction with the client application determines for each encrypted portion of the common content whether an associated decryption key has been received. Each encrypted portion for which a decryption key is available is decrypted and displayed or otherwise utilized. For each encrypted portion for which a decryption key is not available, the unencrypted portion corresponding to the encrypted portion is displayed or otherwise utilized. In this way, only the encrypted portions that a user of a client computer system is authorized to view or utilize are decrypted. An alternate representation of the encrypted data might also be presented for encrypted portions that the user is not authorized to view or utilize. Additional details regarding the various components and processes described above will be provided below with regard to FIGS. 1-6.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

FIG. 1 and its associated description are intended to provide a description of a suitable computing environment in which the embodiments described herein may be implemented along with aspects of several software and hardware components disclosed herein. In particular, FIG. 1 is a system and network diagram that shows an illustrative operating environment for the embodiments disclosed herein that includes one or more client computer systems 102A-102B (which may be referred to individually as a client computer system 102 or collectively as the client computer systems 102) and a content server system 104.

The client computer systems 102 and the content server system 104 are interconnected by way of a network 106. In this regard, it should be appreciated that although only a single network is illustrated in FIG. 1, many such networks may be utilized. For instance, one or more local area networks ("LANs") and a wide area network ("WAN"), such as the Internet, may be utilized to interconnect the content server system 104 and the client computer systems 102. Additionally, although only one content server system 104 and two client computer systems 102 have been illustrated in FIG. 1, any number of systems may be utilized in the manner presented herein. Different systems might also be utilized to provide the various functions described herein as being performed by the content server system 104. For instance, different systems might be utilized to generate content, to distribute the content, and to distribute decryption keys.

As will be described in greater detail below, the content server system 104 comprises one or more server computers configured to generate and provide common content 112 to the client computer systems 102. As will be described in greater detail below, the common content 112 is content that includes encrypted portions and unencrypted portions. The encrypted portions are utilized to store viewable or unviewable data, such as sensitive data like a user's name or e-mail address. The encrypted portions can be decrypted and utilized only by users that are authorized to decrypt these portions. In this way, the common content 112 can be generated and cached prior to receiving requests for the common content 112. Additionally, the same common content 112 can be distributed to each of the client computer systems 102 rather than generating the content specifically for each client computer system 102 each time the content is requested. Additional details regarding this process will be provided below.

In order to generate and provide the common content 112, the content server system 104 is configured in one embodiment to execute a content server application 120 and a content generation module 122. The content server application 120 is configured to authenticate users of the client computer systems 102 and to receive and respond to requests for the common content 112. The content generation module 122 is configured to generate the common content 112. In this regard, the content generation module 122 may utilize one or more encryption keys 124 and various encryption mechanisms known to those skilled in the art to encrypt portions of the common content 112. Additional details regarding the structure of the common content 112 and its generation will be provided below with regard to FIGS. 2 and 5, respectively.

Once the content generation module 122 has generated the common content 112, the content server application 120 provides the common content 112 to the client computer systems 102. As discussed briefly above, the common content 112 may be provided to the client computer systems 102 in response to requests for the common content 112 received from the client computer systems 102, utilizing various "push" mechanisms, or through the use of a content distribution network. Other mechanisms might also be utilized to provide the common content 112 to the client computer systems 102.

In one embodiment, the content server application 120 is a Web server application. In this embodiment, the content generation module 122 is a software component configured for execution in conjunction with the content server application 120. It should be appreciated, however, that other types and configurations of software components might be utilized to perform the functions of the content generation module 122 and the content server application 120 described herein. It should also be appreciated that the functionality disclosed herein as being performed by the content generation module 122 might be performed by the content server application 120, and vice versa. Additional details regarding the operation of the content server system 104 will be provided below with regard to FIG. 5.

The client computer systems 102 are computing devices configured to receive and display or otherwise utilize the common content 112. For instance, and without limitation, the client computer systems 102 may be standard desktop, laptop, tablet, and/or mobile computing devices capable of executing a client application 108 and a content display module 110 for displaying or otherwise utilizing the common content 112. Other types of devices might also be utilized.

In one embodiment, the client application 108 is a Web browser application. In this embodiment, the content display module 110 is an executable software module configured for operation in conjunction with the Web browser application. For instance, the content display module 110 may be a plug-in configured for use with a Web browser application. The content display module 110 might also comprise other types of program code executable by or within a Web browser application. For instance, and without limitation, the content display module 110 may comprise scripts or other types of code that is executable within an environment provided by a Web browser application.

It should be appreciated that the client application 108 and the content display module 110 may be implemented in other ways and using other technologies. For instance, the client computer system 102 might be a mobile device and the client application 108 might be a native application configured for use with the mobile device and for utilizing the common content 112 in the manner disclosed herein. Additionally, it should be appreciated that the functionality described herein as being performed by the content display module 110 might be performed by the client application 108, and vice versa. Other implementations will become apparent to those of skill in the art.

As illustrated in FIG. 1, each of the client computer systems 102 has an associated user 100. For instance, the client computer system 102A has an associated user 100A and the client computer system 102B has an associated user 100B. According to one embodiment disclosed herein, the client application 108 is configured to receive user credentials from the users 100. For instance, the user credentials 118A may be received from the user 100A. Similarly, the user credentials 118B may be received from the user 100B. The user credentials 118 may be a login name, password, personal identification number ("PIN"), or other information that uniquely identifies the user 100 that provided the credentials and that may be utilized by the content server system 104 to authenticate the user.

As will be described in greater detail below, the content server system 104 utilizes the provided user credentials 118 to determine an authorization level of the user 100 that provided the credentials. The content server system 104 then utilizes the determined authorization level to identify the decryption keys 116 that should be provided to the client computer system 102 associated with the user. The decryption keys 116 are utilized by the content display module 110 to decrypt portions of the common content 112 that the user 100 is authorized to view or otherwise utilize. Additional regarding this process will be provided below with regard to FIG. 4.

Once the content server system 104 identifies the decryption keys 116 to be provided to each of the client computer systems 102, the content server system 104 provides the appropriate decryption keys 116 to each of the client computer systems 102. For instance, the content server system 104 might provide the decryption keys 116A associated with the user 100A to the client application 108 executing on the client computer system 102A. Similarly, the content server system 104 might provide the decryption keys 116B associated with the user 100B to the client application 108 executing on the client computer system 102B. As described above, the particular decryption keys 116 provided to each client computer system 102 are identified based upon the authorization level of the user 100 associated with the client computer system 102. The number of decryption keys 116 provided to each client computer system 102 may be equivalent to the number of encrypted portions of the common content 112 that the associated user is authorized to access.

According to embodiments, the client computer systems 102 may be configured to store the received decryption keys 116 in a cache. For example, where the client application 108 is a Web browser application, the decryption keys may be stored in a Web browser cache. In the example shown in FIG. 1, for instance, the decryption keys 116A have been stored in the cache 114A on the client computer system 102A and the decryption keys 116B have been stored in the cache 114B on the client computer system 102B. Other types of caching mechanisms might also be utilized.

When a user 100A requests to view or otherwise interact with the common content 112, the client computer system 102A retrieves the common content 112 from the content server system 104. Alternately, the common content 112 may be retrieved and cached at the client computer system 102A prior to receiving a request to view or otherwise utilize the common content 112. Additionally, as also mentioned above, the common content 112 may be "pushed" to the client computer systems 102 or retrieved from another location, such as a content distribution network.

In order to display the common content 112, the content display module 110 determines whether an associated decryption key 116 has been received for each encrypted portion of the common content 112. The content display module 110 then decrypts each encrypted portion for which a decryption key 116 is available. The decrypted content may then be displayed to the user or otherwise utilized.

For each encrypted portion for which a decryption key 116 is not available, the content display module 110 displays or otherwise utilizes an unencrypted portion of the common content 112. For instance, the unencrypted portion might contain an alternate representation of the encrypted data. In this way, a user 100 can be presented an alternate representation of data contained in encrypted portions that the user 100 is not authorized to view or utilize. Additional details regarding these aspects will be provided below with regard to FIGS. 2-6.

According to various embodiments, the content server system 104 might be configured to specify an expiration period with each of the decryption keys 116. For instance, an expiration period might be specified as an absolute value (e.g. the key expires on Oct. 24, 2011) or a relative value (e.g. the key expires in 24 hours from now) and included with each decryption key 116. In this embodiment, the content server system 104 might be configured to refresh the decryption keys 116 stored at each client computer system 102 after previously distributed keys 116 have expired. In this embodiment, the common content 112 would be periodically regenerated with encryption keys 124 corresponding to the new decryption keys 116.

Figure 2:
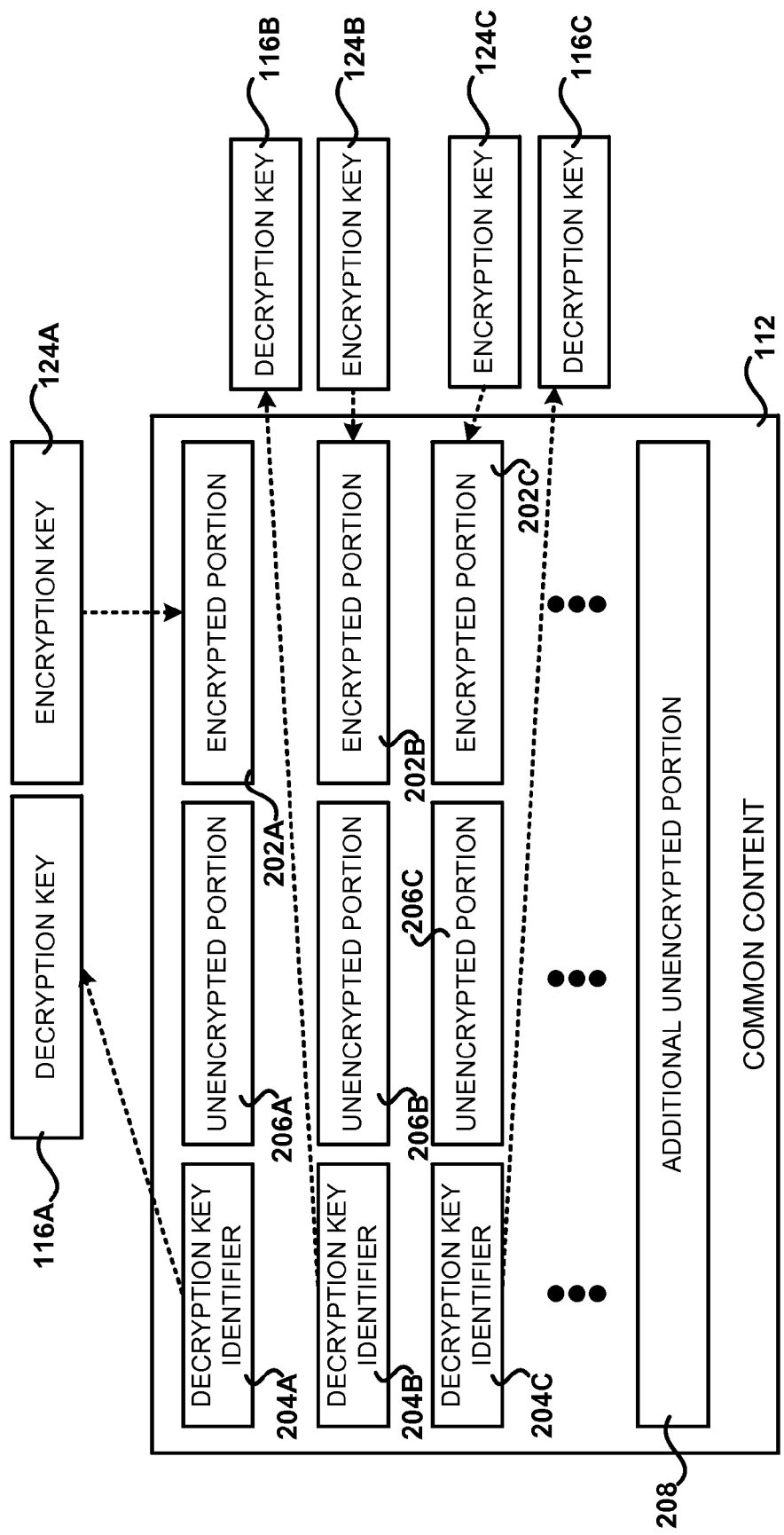
FIG. 2 is a data structure diagram showing aspects of common content generated and distributed according to the various embodiments disclosed herein.

FIG. 2 is a data structure diagram showing aspects of the common content 112 generated and distributed by the content server system 104 in the various embodiments disclosed herein. As illustrated in FIG. 2, the common content 112 includes a number of encrypted portions 202A-202C. The encrypted portions 202A-202C may be utilized to store sensitive information that is viewable or unviewable. For instance, the encrypted portions 202A-202C might be utilized to store text, graphics, sound, e-mail addresses, uniform resource locators ("URLs"), or other types of arbitrary data in an encrypted fashion.

The encrypted portions 202A-202C might also be utilized to store interpretable or executable program code. For instance, the encrypted portions 202A-202C might be utilized to store JAVASCRIPT or other types of scripts for performing various functions, such as retrieving and decrypting sensitive data. Other types of executable program code might also be stored in one or more of the encrypted portions 202A-202C according to embodiments.

According to embodiments disclosed herein, each encrypted portion 202A-202C is encrypted using a corresponding encryption key 124A-124C, respectively. An appropriate encryption algorithm may be utilized to create the encrypted portions 202A-202C using the encryption keys 124A-124C.

The common content 112 also includes a decryption key identifier 204A-204C associated with each of the encrypted portions 202A-202C. Each decryption key identifier 204A-204C contains data identifying a decryption key 116A-116C, respectively, which can be utilized to decrypt the corresponding encrypted portion 202A. For instance, in the example shown in FIG. 2, the decryption key identifier 204A identifies the decryption key 116A for decrypting the encrypted portion 202A, the decryption key identifier 204B identifies the decryption key 116B for decrypting the encrypted portion 202B, and the decryption key identifier 204C identifies the decryption key 116C for decrypting the encrypted portion 202C.

According to one embodiment, the common content 112 also includes an unencrypted portion 206A-206C associated with each of the encrypted portions 202A-202C. The unencrypted portions 206A-206C may be utilized to store unencrypted data that is associated with the encrypted data stored in the encrypted portions 202A-202C, respectively. For instance, the unencrypted portions 206A-206C may be utilized to store alternate versions of the data stored in the corresponding encrypted portions 202A-202C. As an example, the encrypted portions 202A may be utilized to store e-mail addresses in one embodiment. In this embodiment, the unencrypted portions 206A-206C may be utilized to store obfuscated versions of the e-mail addresses stored in the corresponding encrypted portions 202A-202C. The unencrypted portions 206A-206C might also be utilized to store script or other types of executable program code. Additional details regarding this capability will be provided below with regard to FIG. 3.

According to embodiments, the common content 112 might also include an additional unencrypted portion 208 for storing unencrypted data that is not directly associated with the encrypted portions 202A-202C. The common content 112 might also include other data not illustrated in FIG. 2.

It should be appreciated that the common content 112 is implemented in one embodiment utilizing JAVASCRIPT OBJECT NOTATION ("JSON"). Other implementations utilizing other types of data structures including structured and unstructured data might also be utilized in other implementations.

Figure 3:
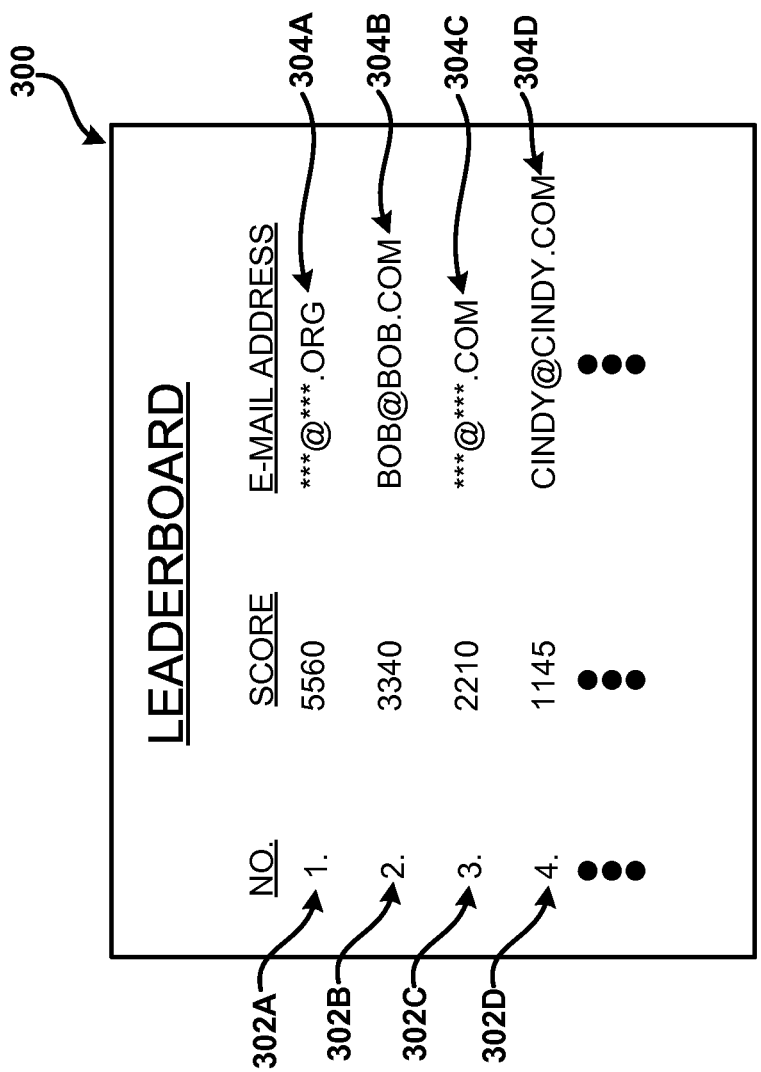
FIG. 3 is a user interface diagram showing aspects of a leaderboard generated utilizing the various concepts and technologies described herein.

FIG. 3 is a user interface diagram showing aspects of a leaderboard 300 generated utilizing the various concepts and technologies described herein. As mentioned above, Web sites, games, and mobile applications frequently present a "leaderboard" of top users. Some leaderboards are configured to display potentially sensitive information about the top users to other users having an appropriate authorization level and to obfuscate the sensitive information for users without appropriate authorization. For example, a leaderboard might be configured to show the name, e-mail address, and/or other personally identifying information of top users to other users that have the authorization to view the information.

As also mentioned above, leaderboards are typically generated by a server computer in direct response to requests made by client applications for the leaderboard. The leaderboard is generated such that it includes only the sensitive data that the requesting user is authorized to view. However, although separately generating leaderboards in this manner each time a user request is made works well on a small scale, generating leaderboards for each request on a very large scale can be extremely taxing on the server computers responsible for generating the content. The embodiments described herein can be utilized to generate and distribute a leaderboard in a more efficient manner. Once such leaderboard 300 is shown in FIG. 3.

In the example shown in FIG. 3, a leaderboard 300 has been generated utilizing the concepts and technologies described herein. The leaderboard 300 includes a number of entries 302A-302D for a like number of top users. In this example, the entries 302A-302D correspond to users having the top scores for a game. The score for each user is also shown in the entries 302A-302D.

Each of the entries 302A-302D also shows an e-mail address 304A-304D for the corresponding user. However, because wide distribution of e-mail addresses may be undesirable, the e-mail addresses 304A-304D of the users shown in the leaderboard are only displayed to authorized users 100. A user 100 may be authorized to view the e-mail address of a user listed in the leaderboard 300, for instance, if they are "friends" with the user or can otherwise show that they have some relationship to the user. In the example shown in FIG. 3, the user 100 for which the leaderboard 300 was displayed is authorized to view the e-mail addresses 304B and 304D for the users identified by the second and fourth entries 302A and 302D. The e-mail addresses for the other entries 302B and 302C have been displayed in obfuscated form.

In order to generate the leaderboard 300 shown in FIG. 3, common content 112 is created for the leaderboard 300. Encrypted portions 202 are generated by encrypting each of the e-mail addresses for the users identified in the leaderboard 300. Unencrypted portions 206 are also included that store the obfuscated versions of each e-mail address. Other fields might also be included for storing the entry numbers, scores, and other information in an unencrypted form.

Decryption keys 116 are then provided to the client computer systems 102 for decrypting the encrypted portions of the common content 112. In particular, the authorization level of each user 100 desiring to view the leaderboard 300 is determined, such as based upon the user credentials 118. Appropriate decryption keys 116 are then provided to the user's client computer system 102 for decrypting the appropriate encrypted portions 202 of the common content 112. For instance, in the example shown in FIG. 3, decryption keys 116 were provided for decrypting the encrypted portions 202 containing the e-mail addresses 304B and 304D. Decryption keys 116 were not provided for decrypting the encrypted portions 202 storing the e-mail addresses 304A and 304C. Consequently, obfuscated versions of the e-mail addresses 304A and 304C have been displayed in the leaderboard 300.

It should be appreciated that the embodiments disclosed herein are not limited to the provision of a leaderboard 300. Rather, the embodiments disclosed herein can be utilized to generate and distribute content in any environment where it is desirable to generate the content only once for distribution to a potentially large number of users. Decryption keys can then be provided to the users that allow them to decrypt the portions of the content that they are authorized to view and/or otherwise utilize. For example, and without limitation, the embodiments disclosed herein may be utilized with Web sites, social networking sites such as the FACEBOOK social networking site, micro-blogging services such as the TWITTER micro-blogging service, database services, games, word processing documents, spreadsheet documents, presentation documents, and other types of services, documents, content, and applications.

Figure 4:
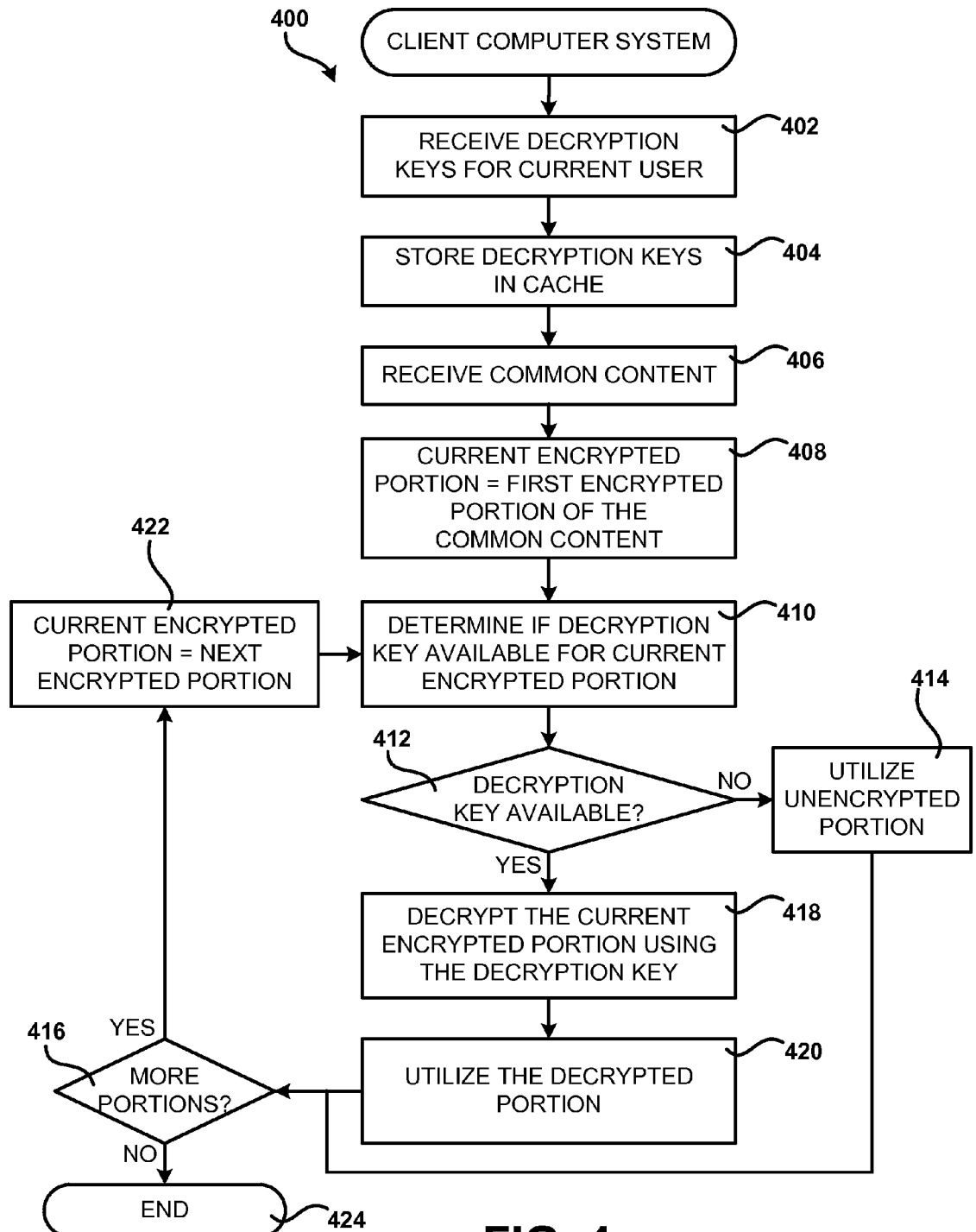
FIG. 4 is a flow diagram showing aspects of the operation of a client computer configured to receive and display common content in one embodiment disclosed herein.

Turning now to FIG. 4, additional details will be provided regarding one illustrative process disclosed herein for scalably providing sensitive data to users with varying authorization levels. It should be appreciated that the logical operations described herein with respect to FIG. 4 and the other FIGURES are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIG. 4 is a flow diagram showing a routine 400 that illustrates aspects of the operation of a client computer system 102 that is configured to receive and display the common content 112 in one embodiment disclosed herein. The routine 400 begins at operation 402, where a client computer system 102 receives the decryption keys 116 for the current user 100 from the content server system 104. For instance, in the example shown in FIG. 1 and described above, the client computer system 102A has received the decryption keys 116A for the user 100A and the client computer system 102B has received the decryption keys 116B for the user 100B.

From operation 402, the routine 400 proceeds to operation 404, where the client application 108 stores the received decryption keys 116 in a cache. As mentioned above, the decryption keys may be stored in a Web browser cache or utilizing another type of cache mechanism. As also mentioned above, the decryption keys 116 may be received at a client computer system 102 and cached prior to receiving the common content 112. The decryption keys 116 might also be received at or around the same time that the common content 112 is received.

From operation 404, the routine 400 proceeds to operation 406, where the client computer system 102 receives the common content 112. If the user 100 requests to view or otherwise utilize the common content 112, the routine 400 proceeds to operation 408, where the content display module 110 initializes a variable for keeping track of the current encrypted portion 202 that is being processed. In particular, the variable is initialized to reflect the first encrypted portion 202 in the common content 112 at operation 408.

From operation 408, the routine 400 proceeds to operation 410, where the content display module 110 determines whether a decryption key 116 has been received from the content server system 104 for decrypting the current encrypted portion 202. If a decryption key 116 has not been received for the current encrypted portion 202 of the common content 112, then the routine 400 proceeds from operation 412 to operation 414.

At operation 414, the unencrypted portion 206 of the current content 112 corresponding to the current encrypted portion 202 is utilized. For instance, the unencrypted portion 206 corresponding to the current encrypted portion 202 may be displayed, such as the obfuscated e-mail addresses shown in the leaderboard 300 described above. If the unencrypted portion 206 includes program code or script, the code or script may be executed. From operation 414, the routine 400 proceeds to operation 416, described below.

If, at operation 412, the content display module 110 determines that a decryption key 116 has been received for decrypting the current encrypted portion 202, then the routine 400 proceeds from operation 412 to operation 418. At operation 418, the content display module 110 utilizes the received decryption key 116 to decrypt the current encrypted portion 202. Once the current encrypted portion 202 has been decrypted, the routine 400 proceeds to operation 420 where the decrypted data is displayed or otherwise utilized, such as the display of the e-mail addresses in the leaderboard 300 shown in FIG. 3. If the encrypted portion 202 includes program code or script, the code or script may be executed. From operation 420, the routine 400 proceeds to operation 416.

At operation 416, the content display module 110 determines whether any additional encrypted portions 202 remain in the common content 112 to be processed. If so, the routine 400 proceeds from operation 416 to operation 422, where the variable utilized to keep track of the current encrypted portion 202 is incremented to identify the next encrypted portion 202 of the common content 112. The routine 400 then proceeds from operation 422 to operation 410, where the next encrypted portion 202 is processed in the manner described above. If no additional encrypted portions 202 remain in the common content 112 to be processed, the routine 400 proceeds from operation 416 to operation 424, where it ends.

Figure 5:
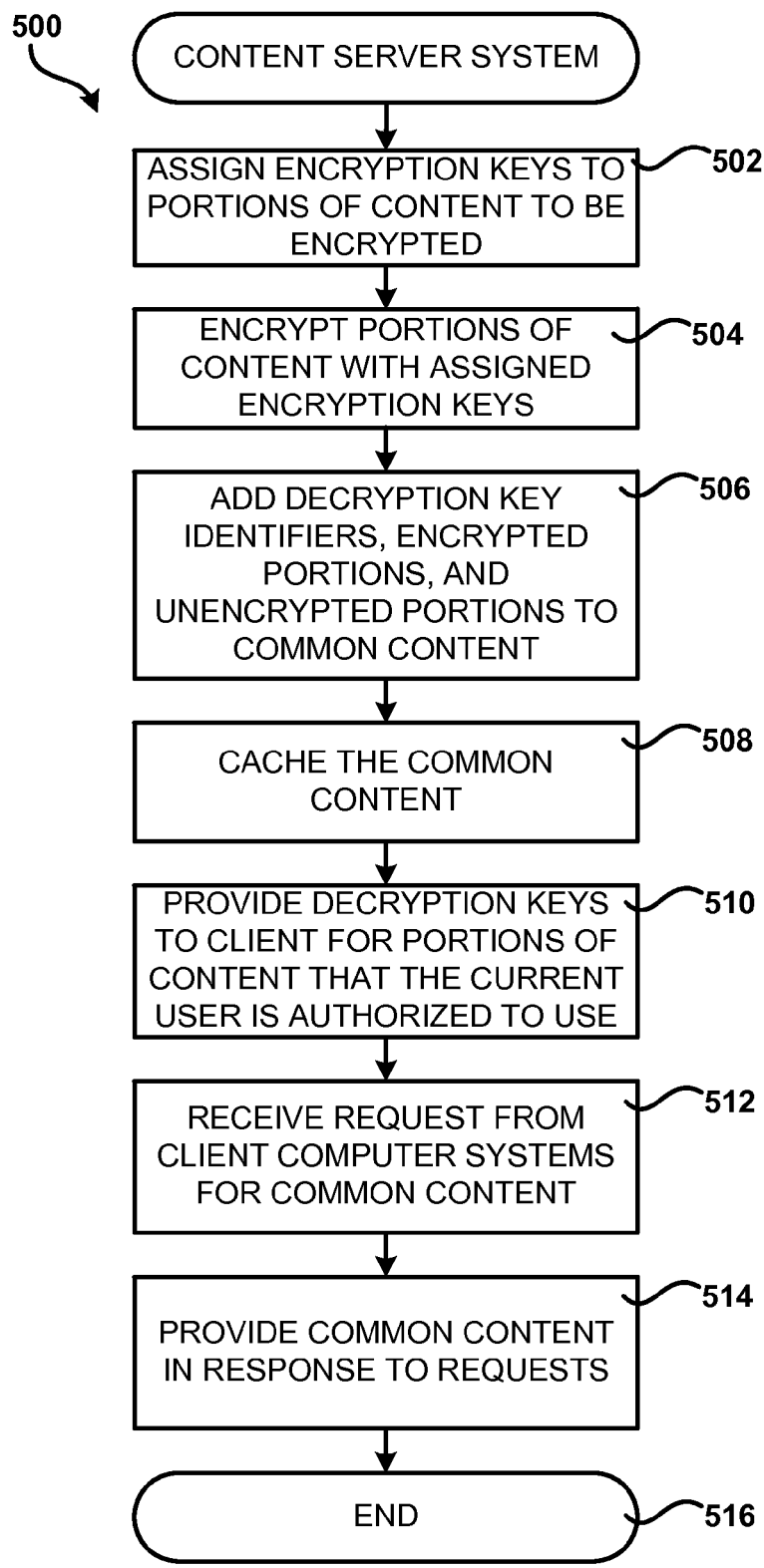
FIG. 5 is a flow diagram showing aspects of the operation of a content server system for generating and providing common content according to one embodiment disclosed herein.

FIG. 5 is a flow diagram showing a routine 500 that illustrates aspects of the operation of the content server system 104 for generating and providing the common content 112 to one or more client computer systems 102 according to one embodiment disclosed herein. The routine 500 begins at operation 502, where the content generation module 122 assigns encryption keys 124 to each of the portions of content to be encrypted. For instance, in the example given in FIG. 3, above, the content generation module 122 might assign a separate encryption key 124 to each of the e-mail addresses to be encrypted in the leaderboard 300.

From operation 502, the routine 500 proceeds to operation 504, where the content generation module 112 encrypts the portions of content with the assigned encryption keys 124, thereby generating the encrypted portions 202 of the common content 112. Once the encrypted portions 202 have been generated, the routine 500 proceeds to operation 506, where the content generation module 122 adds the decryption key identifiers 204 to the common content 112 that identify the encryption keys 124 utilized to encrypt the encrypted portions 202. The content generation module 122 also adds the unencrypted portions 206 to the common content 112 that correspond to the encrypted portions 202. Other fields and data might also be added to the common content, such as the additional unencrypted portion 208.

Once the common content 112 has been generated, the routine 500 proceeds to operation 508, where the content server system 104 caches the common content 112. The common content 112 may be cached at the content server system 104, through the use of a distribution network, on the client computer systems 102, or in another manner.

From operation 508, the routine 500 proceeds to operation 510, where the content server application 120 provides the decryption keys 116 to each client computer system 102 for the portions of the common content 112 that the user associated with each client computer system 102 is authorized to view and/or otherwise utilize. As mentioned above, the user credentials 118 for each user 100 may be utilized to determine an authorization level for the user and the decryption keys 116 that should be provided to each client computer system 102. As also mentioned above, the content server system 104 might periodically provide new decryption keys 116 to the client computer systems 102 prior to or following the expiration of previously provided decryption keys 116. In this regard, the content server system 104 might also re-generate the common content 112 with encryption keys 124 corresponding to the new decryption keys and provided the updated common content 112 to the client computer systems 102.

From operation 510, the routine 500 proceeds to operation 512, where the content server application 120 receives a request from a client computer system 102 for the common content 112. As mentioned above, the common content 112 may be generated and cached prior to receiving a request for the common content 112. In this manner, the content server application 120 does not have to generate the common content 112 at the time the request is received. Rather, the content server application 120 only has to respond to the request with the common content 112. This occurs at operation 514. As also mentioned above, the client computer system 102 might also obtain the common content 112 from another location, such as a content distribution network. The client computer system 102 then processes the common content 112 in the manner described above with regard to FIG. 2. From operation 514 the routine 500 proceeds to operation 516, where it ends.

It should be appreciated that operations 502-508 for generating and caching the common content 112, operation 510 for providing the decryption keys 116 to the client computer systems 102, and operations 512-514 for providing the common content 112 to the client computer systems 102 may be performed in virtually any order. For instance, decryption keys 116 may be provided to the client computer systems 102 in advance of the creation and provision of the common content 112. Alternately, the decryption keys 116 may be provided to the client computer systems 102 at the same time or even after the provision of the common content 112 to the client computer systems 102.

Figure 6:
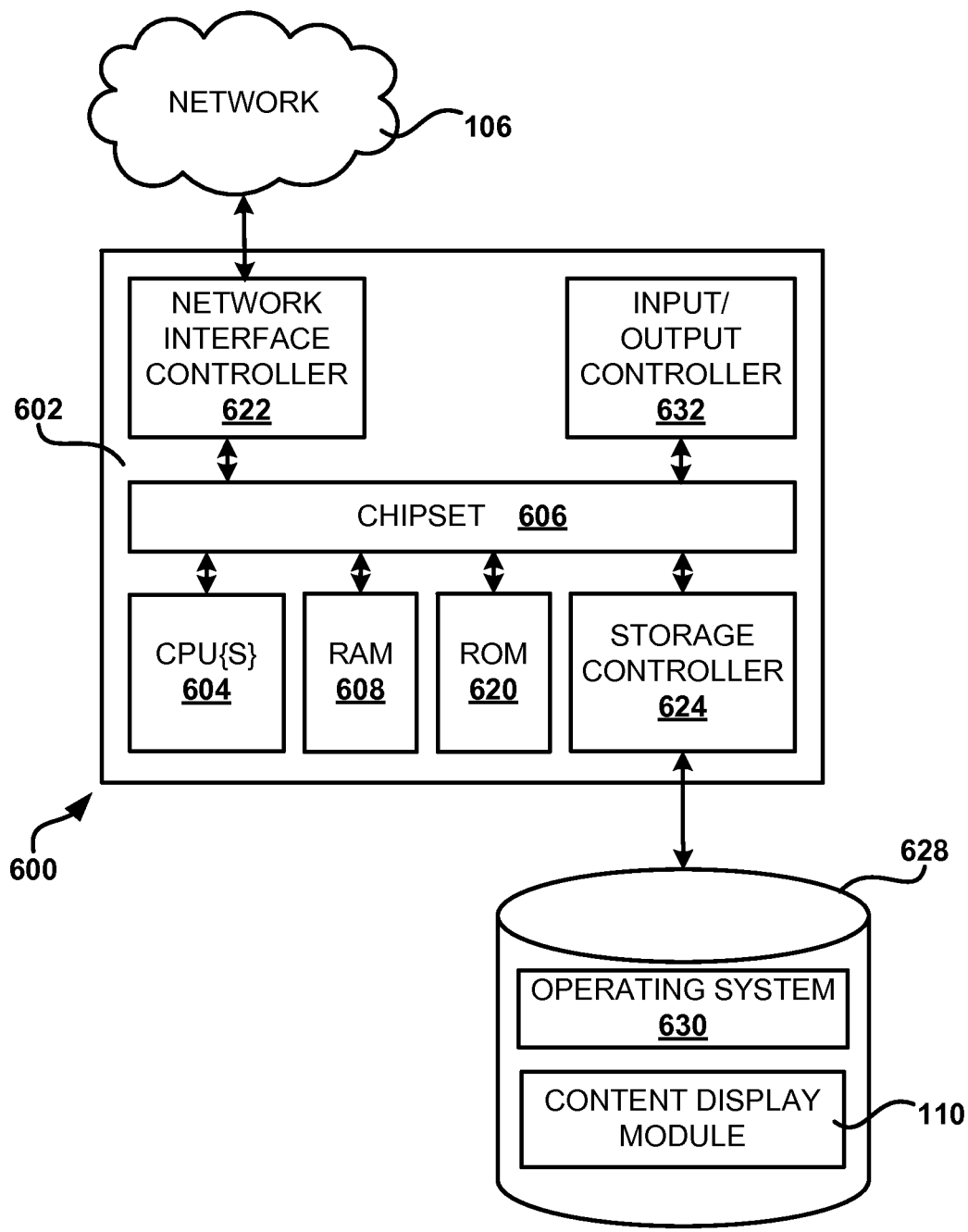
FIG. 6 is a computer architecture diagram showing an illustrative computer hardware architecture for implementing the various computing devices described in embodiments presented herein.

FIG. 6 shows an example computer architecture for a computer 600 capable of executing the software components described above. The computer architecture shown in FIG. 6 illustrates a conventional server computer, workstation, desktop computer, laptop, network appliance, personal digital assistant ("PDA"), e-reader, digital cellular phone, or other computing device, and may be utilized to execute any aspects of the software components presented herein.

The computer 600 includes a baseboard, or "motherboard" 602, which is a printed circuit board to which a multitude of components or devices may be connected by way of a system bus or other electrical communication paths. In one illustrative embodiment, one or more central processing units ("CPUs") 604 operate in conjunction with a chipset 606. The CPUs 604 are standard programmable processors that perform arithmetic and logical operations necessary for the operation of the computer 600.

The CPUs 604 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 606 provides an interface between the CPUs 604 and the remainder of the components and devices on the baseboard. The chipset 606 may provide an interface to a random access memory ("RAM") 608, used as the main memory in the computer 600. The chipset 606 may further provide an interface to a computer-readable storage medium such as a read-only memory ("ROM") 620 or non-volatile RAM ("NVRAM") for storing basic routines that that help to startup the computer 600 and to transfer information between the various components and devices. The ROM 620 or NVRAM may also store other software components necessary for the operation of the computer 600 in accordance with the embodiments described herein.

The computer 600 may operate in a networked environment using logical connections to remote computing devices and computer systems through the network 108. The chipset 606 may include functionality for providing network connectivity through a network interface controller ("NIC") 622, such as a gigabit Ethernet adapter. The NIC 622 is capable of connecting the computer 600 to other computing devices over the network 106. It should be appreciated that multiple NICs 622 may be present in the computer 600, connecting the computer to other types of networks and remote computer systems.

The computer 600 may be connected to a mass storage device 628 that provides non-volatile storage for the computer. The mass storage device 628 may store system programs, application programs, other program modules, and data, which have been described in detail herein. The mass storage device 628 may be connected to the computer 600 through a storage controller 624 connected to the chipset 606. The mass storage device 628 may consist of one or more physical storage units. The storage controller 624 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 may store data on the mass storage device 628 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 628 is characterized as primary or secondary storage, and the like.

For example, the computer 600 may store information to the mass storage device 628 by issuing instructions through the storage controller 624 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 may further read information from the mass storage device 628 by detecting the physical states or characteristics of one or more particular locations within the physical storage units.

In addition to the mass storage device 628 described above, the computer 600 may have access to other computer-readable storage medium to store and retrieve information, such as program modules, data structures, or other data. It should be appreciated by those skilled in the art that computer-readable storage media can be any available media that provides for the storage of non-transitory data and that may be accessed by the computer 600.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 628 may store an operating system 630 utilized to control the operation of the computer 600. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 628 may store other system or application programs and data utilized by the computer 600, such as the content display module 110 and/or the other software components described above.

In one embodiment, the mass storage device 628 or other computer-readable storage media is encoded with computer-executable instructions which, when loaded into the computer 600, transforms the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the routines 400 and 500 described above with regard to FIGS. 4 and 5.

The computer 600 may also include an input/output controller 632 for receiving and processing input from a number of input devices, such as a keyboard, a mouse, a touchpad, a touch screen, an electronic stylus, or other type of input device. Similarly, the input/output controller 632 may provide output to a display, such as a computer monitor, a flat-panel display, a digital projector, a printer, a plotter, or other type of output device. It will be appreciated that the computer 600 may not include all of the components shown in FIG. 6, may include other components that are not explicitly shown in FIG. 6, or may utilize an architecture completely different than that shown in FIG. 6.

Based on the foregoing, it should be appreciated that technologies for presenting sensitive information to users having varying authorization levels have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A non-transitory computer-readable storage medium that has computer-executable instructions stored thereupon which, when executed by a computer, causes the computer to:
  receive one or more decryption keys, each of the decryption keys for use in decrypting an encrypted portion of common content;
  store the decryption keys in a cache;
  receive the common content, the common content comprising a plurality of encrypted portions, an unencrypted portion corresponding to each of the encrypted portions, and a decryption key identifier for each of the encrypted portions that identifies a decryption key for decrypting the corresponding encrypted portion;
  receive a request to view the common content; and
  in response to receiving the request to view the common content, to
    determine if a decryption key is stored in the cache for each of the encrypted portions in the common content,
    decrypt the encrypted portion for each encrypted portion having a decryption key stored in the cache to obtain decrypted content and displaying the decrypted content, and
    display the unencrypted portion for each encrypted portion not having a decryption key stored in the cache.

2. The non-transitory computer-readable storage medium of claim 1, wherein the common content is distributed to a plurality of client computer systems associated with a plurality of users, and wherein the decryption keys are associated with one of the plurality of users.

3. The non-transitory computer-readable storage medium of claim 2, wherein the decryption keys are received and stored in the cache after the common content is received.

4. The non-transitory computer-readable storage medium of claim 3, wherein the decryption keys are received and stored in the cache prior to receiving the common content.

5. The non-transitory computer-readable storage medium of claim 3, wherein the decryption keys are received with the common content.

6. The non-transitory computer-readable storage medium of claim 3, wherein each unencrypted portion of the common content comprises an alternate version of a corresponding encrypted portion of the common content.

7. The non-transitory computer-readable storage medium of claim 6, wherein a web browser application receives and stores the decryption keys in a web browser cache, and wherein a content display module executing in conjunction with the web browser application determines whether the decryption keys are stored in the web browser cache for the encrypted portions of the common content, decrypts the encrypted portions, and causes the decrypted content and the unencrypted portions to be displayed by the web browser application.

8. A system comprising:
one or more computers configured to
assign encryption keys to portions of content to be encrypted,
encrypt the portions of the content using the assigned encryption keys to generate encrypted portions,
generate common content comprising the encrypted portions, a decryption key identifier corresponding to each encrypted portion and identifying a decryption key for decrypting the corresponding encrypted portion, and an unencrypted portion corresponding to each encrypted portion,
provide the common content to a plurality of client computer systems, and to
provide one or more decryption keys to each of the client computer systems, the decryption keys provided to each client computer system corresponding to encrypted portions of the common content that users associated with the client computer systems are authorized to utilize.

9. The system of claim 8, wherein the decryption keys are provided to the client computer systems prior to providing the common content to the client computer systems.

10. The system of claim 8, wherein the decryption keys are provided to the client computer systems with the common content.

11. The system of claim 8, wherein the common content is cached prior to providing the common content to the client computer systems.

12. The system of claim 11, wherein each unencrypted portion of the common content comprises an alternate version of a corresponding encrypted portion of the common content.

13. The system of claim 12, wherein the decryption keys further comprise an expiration period, and wherein the one or more computer systems are further configured to periodically provide one or more new decryption keys to each of the client computer systems and to regenerate the encrypted portion of the common content using encryption keys corresponding to the new decryption keys.

14. A computer-implemented method comprising performing computer-implemented operations for:
receiving one or more decryption keys;
receiving content having an encrypted portion, an unencrypted portion associated with the encrypted portion, and a decryption key identifier comprising data identifying a decryption key for decrypting the encrypted portion of the content;
determining if the decryption key identifier identifies one of the received decryption keys;
in response to determining that the decryption key identifier identifies one of the received decryption keys, utilizing the decryption key identified by the decryption key identifier to decrypt the encrypted portion and utilizing the decrypted portion; and
in response to determining that the decryption key identifier does not correspond to one of the received decryption keys, utilizing the unencrypted portion associated with the encrypted portion.

15. The computer-implemented method of claim 14, wherein the decryption keys are received prior to receiving the content and wherein the method further comprises storing the decryption keys in a cache.

16. The computer-implemented method of claim 14, wherein the decryption keys are received with the content.

17. The computer-implemented method of claim 14, wherein the content is generated and cached at a server computer prior to receiving a request for the content.

18. The computer-implemented method of claim 14, wherein the unencrypted portion of the content comprises an alternate version of the encrypted portion of the content.

19. The computer-implemented method of claim 14, wherein the unencrypted portion of the content and the decrypted portion comprise viewable content, wherein utilizing the decrypted portion comprises displaying the decrypted portion, and wherein utilizing the unencrypted portion comprises displaying the unencrypted portion of the content.

20. The computer-implemented method of claim 14, wherein the unencrypted portion of the content and the decrypted portion of the content comprise program code, wherein utilizing the decrypted portion comprises executing the program code contained in the decrypted portion of the content, and wherein utilizing the unencrypted portion comprises executing the program code contained in the unencrypted portion of the content.

21. The computer-implemented method of claim 14, wherein the content is provided to a plurality of client computer systems associated with a plurality of users, and wherein the decryption keys are associated with only one of the plurality of users.

* * * * *